United States Patent
Mizuyoshi (10) Patent No.: US 7,375,789 B2
(45) Date of Patent: May 20, 2008

(54) LIQUID CRYSTAL SHUTTER AND MANUFACTURING METHOD THEREOF

(75) Inventor: Akira Mizuyoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 147 days.

(21) Appl. No.: 11/345,298

(22) Filed: Feb. 2, 2006

(65) Prior Publication Data

US 2006/0203176 A1    Sep. 14, 2006

(30) Foreign Application Priority Data

Mar. 9, 2005    (JP) .............................. 2005-066075

(51) Int. Cl.
*G02F 1/1339*    (2006.01)
(52) U.S. Cl. .................................... 349/155
(58) Field of Classification Search ......... 349/155–156
See application file for complete search history.

(56) References Cited

U.S. PATENT DOCUMENTS

| | | | | |
|---|---|---|---|---|
| 4,740,060 A | * | 4/1988 | Komura et al. | 349/155 |
| 5,537,235 A | * | 7/1996 | Ishihara et al. | 349/155 |
| 5,739,888 A | * | 4/1998 | Ogura et al. | 349/153 |
| 5,812,232 A | * | 9/1998 | Shiroto et al. | 349/157 |
| 6,307,612 B1 | * | 10/2001 | Smith et al. | 349/157 |
| 7,145,628 B2 | * | 12/2006 | Sasaki | 349/190 |

FOREIGN PATENT DOCUMENTS

| | | | |
|---|---|---|---|
| JP | 03-062019 | * | 3/1991 |
| JP | 03-137620 | * | 6/1991 |
| JP | 5-11229 A | | 1/1993 |
| JP | 2003-228054 A | | 8/2003 |

\* cited by examiner

*Primary Examiner*—James A Dudek
(74) *Attorney, Agent, or Firm*—Sughrue Mion, PLLC (57) ABSTRACT

There is disclosed a liquid crystal shutter that uses two kinds of spacers having different spherical diameters from each other. The spacers are formed to satisfy the condition:

$$r < R - \sigma R - \sigma r - P$$

wherein "R" represents a spherical diameter of the first kind spacer, "r" represents a spherical diameter of the second kind spacer, "σR" and "σr" represent standard deviations of these spherical diameters, and "P" represents a permissible amount of dent of a liquid crystal layer. The spacers are dispersed so as to satisfy the condition:

$$[\{\pi \cdot D \cdot (R^2/2) + \pi \cdot d \cdot (r^2/2)\}/x \cdot y] < 1/10^c$$

wherein "D" represents a dispersal density of the first kind spacers, "d" represents a dispersal density of the second kind spacers, "x·y" represents a cavity size of a cell, in which the liquid crystal layer is enclosed, and "C" represents a contrast of the liquid crystal shutter required at the opening and closing thereof.

3 Claims, 7 Drawing Sheets

LIQUID CRYSTAL SHUTTER AND MANUFACTURING METHOD THEREOF

FIELD OF THE INVENTION

The present invention relates to a liquid crystal shutter wherein a liquid crystal layer is enclosed in a spacing that is formed by spherical spacers between a pair of substrates.

BACKGROUND ARTS

A handy printer for printing an image as sent from a camera phone through ultra red communication has recently been sold in the market. Such a handy printer is provided with a liquid crystal shutter as a print engine to expose a photosensitive material to light from a light source. In the liquid crystal shutter, a liquid crystal layer is enclosed in a spacing between a pair of substrates, and the spacing is formed by spherical spacers. On manufacturing the liquid crystal shutter, the liquid crystal layer is enclosed in a cell that is formed by sealing the spacing between the pair of substrates with a sealing member. Thereafter, the pair of substrates are pressed together, so as to make the spacing between the substrates have a given uniform value. Because of a difference in heat shrinkage rate between the liquid crystal layer and the sealing material, the cell can distort during the pressing. If the cell distort, the size of the spacing becomes uneven. In order to prevent the thermal distortion, Japanese Laid-open Patent Application No. Hei 5-11229 suggests applying the pressure while increasing it gradually till the pressure balances out the stress of the spacers.

On the other hand, in order to save manufacturing cost for forming electrode patterns on the substrates, Japanese Laid-open Patent Application No. 2003-228054, suggests forming blocking masks, which prevent leakage of light from other areas than liquid crystal pixels, and electrode coating, which constitutes the electrode pattern, by printing organic gold paste merely on necessary parts and baking the printed paste.

Meanwhile, if the liquid crystal shutter as manufactured in the above-mentioned manner is left under such an environment that accelerates deterioration, e.g. in a temperature cycle of 20° C. to 60° C., air bubbles are generated in the liquid crystal layer because of heat expansion or heat shrinkage. The portion containing the air bubbles result in pixel defects. It has also been found that the change or deterioration in properties of the liquid crystal shutter, as caused by the thermal distortion, will be more serious when the spacing between the substrates is reduced for the sake of speeding operation of the liquid crystal shutter. For this reason, using the conventional liquid crystal shutter in the handy printer or the like, which is often used in outdoor, can remarkably lower the reliability of the article.

SUMMARY OF THE INVENTION

In view of the foregoing, a primary object of the present invention is to provide a liquid crystal shutter that improves the reliability of the article that uses the liquid crystal shutter, and a manufacturing method thereof.

To achieve the above and other objects, a liquid crystal shutter of the present invention comprises a pair of substrates located in opposition to each other; a liquid crystal layer formed by enclosing a liquid crystal in a spacing between the substrates; and spherical spacers dispersed between the substrates to form the spacing, wherein the spacers include at least two kinds which are different in size.

According to a preferred embodiment, the largest spherical diameter and a smaller spherical diameter of the at least two kinds of spacers satisfy the following condition:

$$r < R - \sigma R - \sigma r - P$$

wherein "R" represents the largest spherical diameter, "r" represents the smaller spherical diameter, "σR" and "σr" represent standard deviations of these spherical diameters, and "P" represents a permissible amount of dent of the liquid crystal layer.

It is preferable to disperse the spacers so as to satisfy the following condition:

$$[\{\pi \cdot D \cdot (R^2/2) + \pi \cdot d \cdot (r^2/2)\}/x \cdot y] < 1/10^c$$

wherein "D" represents a dispersal density of the largest spacers among the at least two kinds, "d" represents a dispersal density of the smaller spacers, "x·y" represents a cavity size of a cell, in which the liquid crystal layer is enclosed, and "C" represents a contrast of the liquid crystal shutter required at the opening and closing thereof.

A liquid crystal shutter of another invention comprises a pair of substrates located in opposition to each other; a sealing material constituting a cell in combination with the pair of substrates; spacers dispersed in the cell; a liquid crystal layer enclosed in the cell, wherein the liquid crystal shutter satisfies the following condition:

$$R < H - \sigma R - \sigma H - Q$$

wherein "R" represents a spherical diameter of the spacers, "H" represents a height of the sealing material, "σR" represent a standard deviation of the spherical diameter of the spacers, "σH" represents a standard deviation of the height of the sealing material, and "Q" represents a permissible amount of dent of the sealing material.

In a manufacturing method of a liquid crystal shutter wherein a liquid crystal layer is enclosed in a spacing that is provided by spherical spacers between a pair of substrates, the present invention comprises a step of dispersing at least two kinds of the spacers sequentially from one kind to another on an orientation film formed for orienting the liquid crystal layer.

It is preferable to disperse the spacers sequentially from ones having the smallest spherical diameter to ones having the larger spherical diameter.

According to another invention, a manufacturing method of a liquid crystal shutter wherein a liquid crystal layer is enclosed in a spacing formed by spherical spacers between a pair of substrates, comprises a step of forming a sealing material on the substrates, the sealing material constituting a cell in combination with the substrates, so as to satisfy the following condition:

$$R < H - \sigma R - \sigma H - Q$$

wherein "R" represents a spherical diameter of the spacers, "H" represents a height of the sealing material, "σR" represent a standard deviation of the spherical diameter of the spacers, "σH" represents a standard deviation of the height of the sealing material, and "Q" represents a permissible amount of dent of the sealing material.

Since the liquid crystal shutter of the present invention is manufactured using at least two kinds of spacers having different spherical diameters, the liquid crystal layer is always put under an internal stress without the need for increasing the density of the large diameter spacers which have been used ordinarily. In addition, the small diameter spacers limit the dent or distortion of the liquid crystal layer, especially at low temperatures. Because heat expansion or shrinkage is suppressed, generation of air bubbles in the liquid crystal layer is prevented. So the liquid crystal shutter of the present invention contributes to raising the reliability of the article.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein:

FIG. 3 shows a sequence of manufacturing the liquid crystal shutter, wherein

DESCRIPTION OF THE PREFERRED EMBODIMENTS

Figure 1:
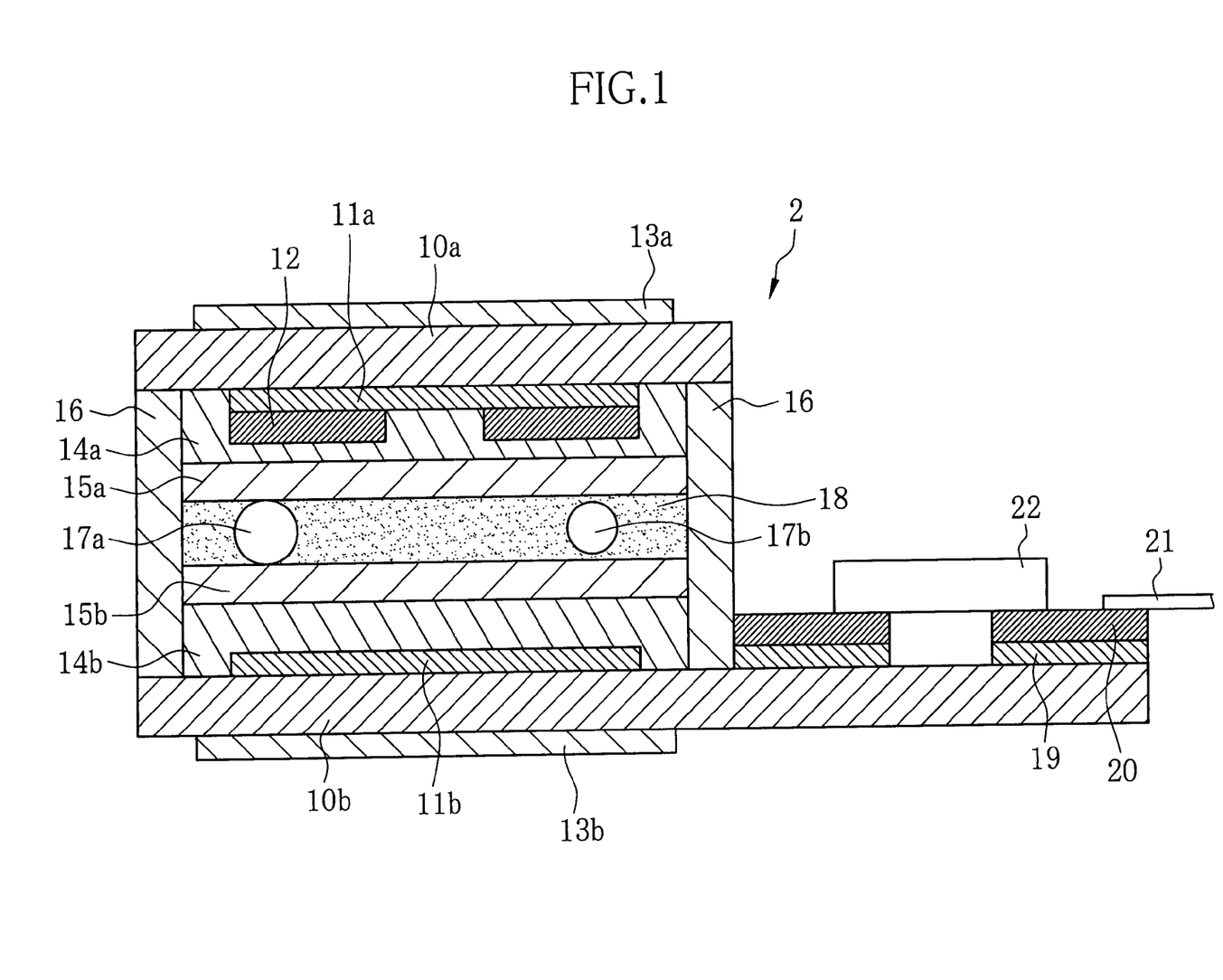
FIG. 1 is a sectional view of a liquid crystal shutter according to an embodiment of the present invention.

As shown in FIG. 1, a liquid crystal shutter 2 has a first glass substrate 10a, on which a common electrode 11a is formed from indium tin oxide (ITO), and a blocking mask 12 made of a gold film is formed on the common electrode 11a. On a second glass substrate 10b of the liquid crystal shutter 2, an individual electrode 11b, that may be called a pixel electrode, is formed from ITO. The common electrode 11a and the individual electrode 11b are a thin light-permeable film. First and second polarizing plates 13a and 13b are bonded to opposite surfaces of the first and second glass substrates 10a and 10b to ones having the electrodes 11a and 11b formed thereon.

The common electrode 11a and the blocking mask 12 are covered with a first isolating film 14a, whereas the individual electrode 11b is covered with a second isolating film 14b. The first and second isolating films 14a and 14b are formed from $SiO_2$, on which first and second orientation films 15a and 15b are formed from polyimide respectively.

The first and second glass substrates 10a and 10b are joined together through a sealing material 16 that is formed from a heat-curable epoxy resin. Thereby, a cell having an internal cavity is formed by the first and second glass substrates 10a and 10b and the sealing material 16. A liquid crystal layer 18 and first and second kinds of spacers 17a and 17b are enclosed and enclosed in the cavity.

Figure 2:
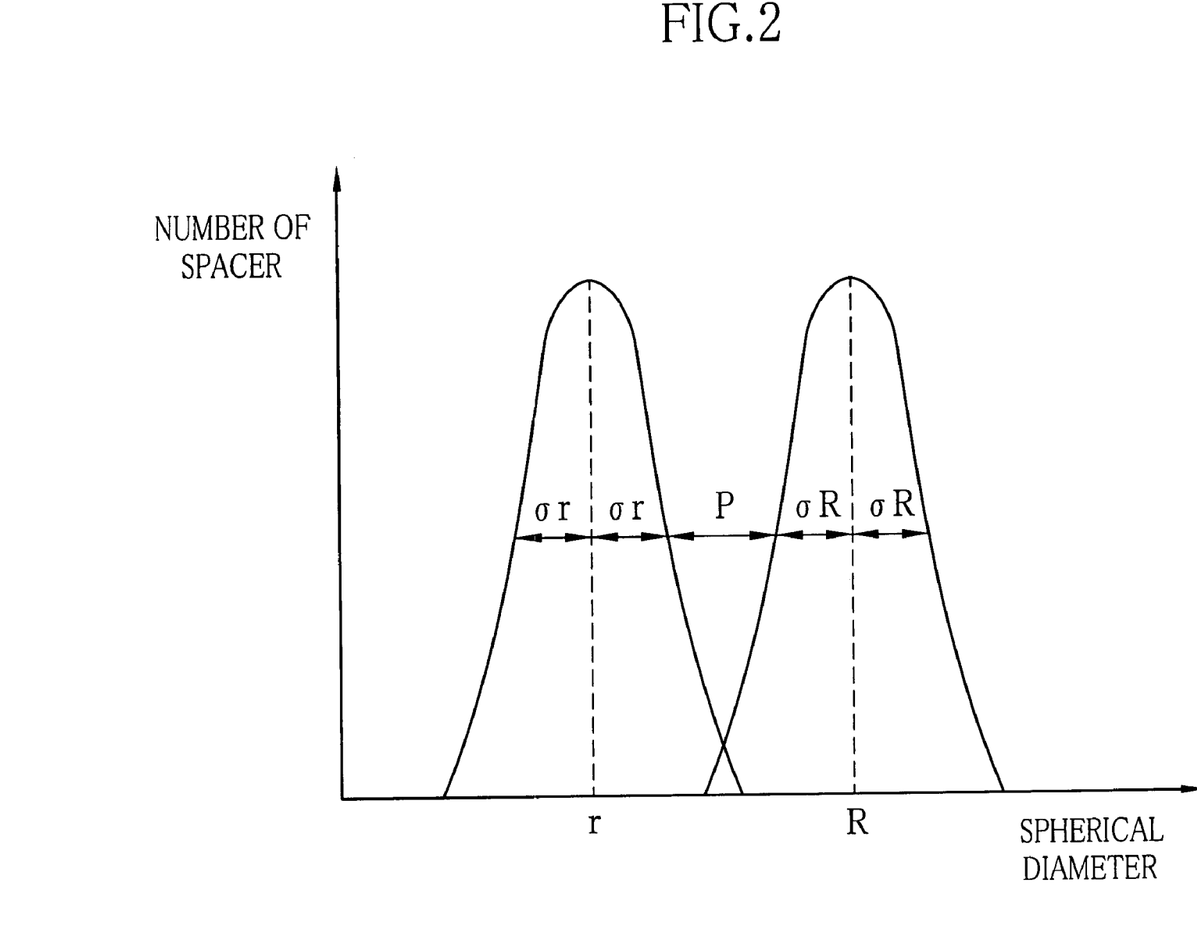
FIG. 2 is a graph illustrating relationships between spherical diameters of spacers and the number of spacers.

As shown in FIG. 2, the first and second spacers 17a and 17b are formed to satisfy the following condition:

$$r < R - \sigma R - \sigma r - P \quad (1)$$

wherein "R" represents a spherical diameter of the first kind spacer 17a, "r" represents a spherical diameter of the second kind spacer 17b, "$\sigma R$" and "$\sigma r$" represent standard deviations of these spherical diameters, and "P" represents a permissible amount of dent of the liquid crystal layer 18. As concrete examples, R=1.6 μm, r=1.3 μm, and σ=±0.5% to ±5%.

The first and second kinds of spacers 17a and 17b are dispersed on the second orientation film 15b so as to satisfy the following condition:

$$[\{\pi \cdot D \cdot (R^2/2) + \pi \cdot d \cdot (r^2/2)\}/x \cdot y] < 1/10^C \quad (2)$$

wherein "D" represents a dispersal density of the first kind spacers 17a, "d" represents a dispersal density of the second kind spacers 17b, "x·y" represents a size of the cavity of the cell, and "C" represents a contrast of the liquid crystal shutter required at the opening and closing thereof. Concretely, D+d=100/mm² to 300/mm². It is to be noted that the contrast C is expressed as lnPo/Pc, wherein Po represent a light transmission amount while the liquid crystal shutter is open, and Pc represents a light transmission amount while the liquid crystal shutter is close.

One side of the second glass substrate 10b extends longer than the first glass substrate 10a. On the extended portion, an electrode pattern 19 is formed from ITO to connect the common electrode 11a to the individual electrode 11b. A gold film 20 is formed along the electrode pattern 19. A signal cable 21 is connected to the gold film 20, and a liquid crystal driver IC 22 is mounted on the gold film 20. The liquid crystal layer 18 is driven by input signals that are supplied from the liquid crystal driver IC 22 through the individual electrode 11b.

Now a method of manufacturing the liquid crystal shutter 2 will be described with reference to FIG. 3.

Figure 3A:
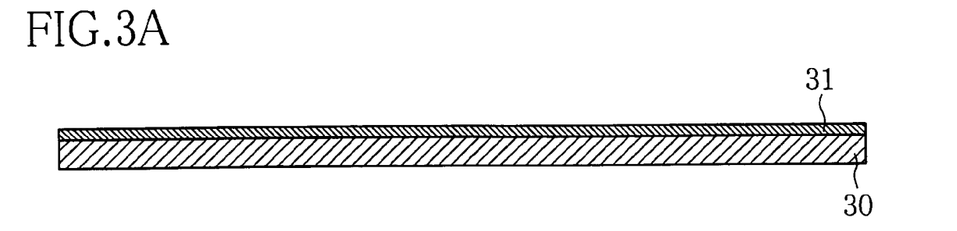
FIG. 3A illustrates a process of forming an ITO film on a glass substrate.

First, as shown in FIG. 3A, an ITO film 31 is formed on the whole surface of one side of a glass substrate 30 by vapor depositing or sputtering. The ITO film 31 will become the common electrode 11a or the individual electrode 11b, and the glass substrate 30 will become the first and second glass substrates 10a and 10b. The glass substrate 30 is formed as an elongated rectangular strip, wherein FIG. 3 shows a transverse section of the glass substrate 30. The glass substrate 30 is finally cut along the transverse direction into several to several tens of basic elements for the liquid crystal shutter 2. It is possible to use a commercially available glass substrate that has an ITO film previously formed thereon.

Figure 3B:
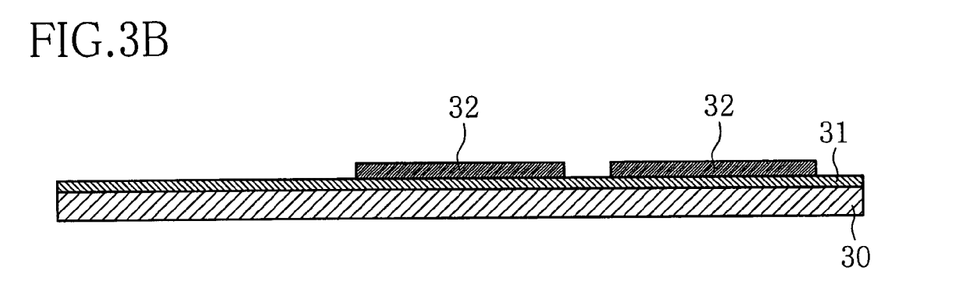
FIG. 3B illustrates a process of forming a gold film on the ITO film.

Next, as shown in FIG. 3B, organic gold paste is printed on those parts of an obverse surface of the ITO film 31 where the blocking mask 12 and the gold film 20 are to be formed, and the printed organic gold paste is dried, baked and polished to form gold films 32, wherein baking temperature is limited up to a glass transition point of the organic gold paste, that is about 600° C.

Figure 3C:
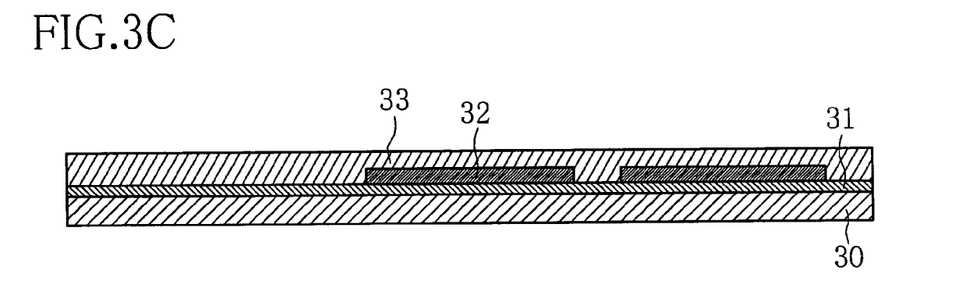
FIG. 3C illustrates a process of forming a photo resistant film on the glass substrate.

Thereafter, as shown in FIG. 3C, a positive photo resistant film 33 is screen-printed on the whole surface of the glass substrate 30 that has the ITO film 31 and the gold film 32 formed thereon. The photo resistant film 33 has a property of decomposing itself as it is exposed to light, and the decomposed portion is solvable in a developing solution, so it is eliminated with the developing solution.

Figure 3D:
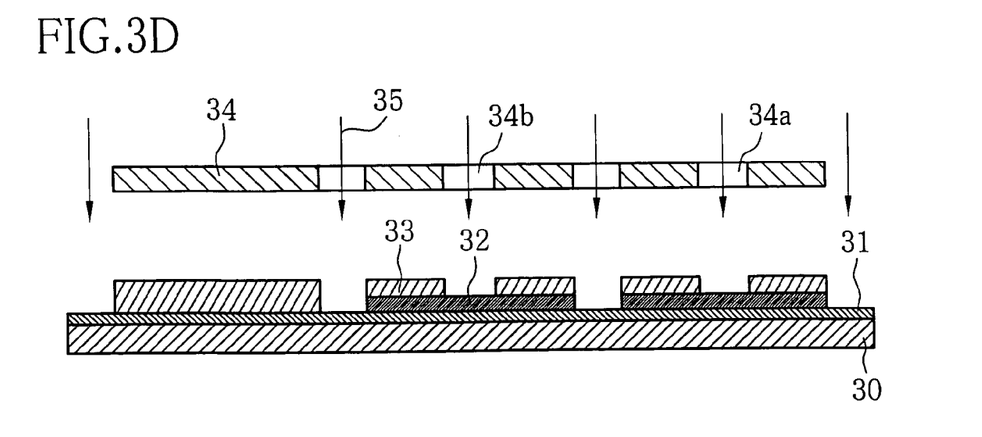
FIG. 3D illustrates a process of projecting ultraviolet rays on the photo resistant film through a photo mask.

After the photo resistant film 33 is formed, a positive photo mask 34 is laid over the photo resistant film 33, as shown in FIG. 3D, and ultraviolet rays 35 are projected from above the photo mask 34. The photo mask 34 is formed with an image 34a of the blocking mask 12 and an image 34b of the electrode pattern 19, wherein the photo mask 34 is transparent in portions having the images 34a and 34b, and other portions of the photo mask 34 are opaque.

After projecting the ultraviolet rays, the glass substrate 30 is immersed in the developing solution, so those portions of the photo resistant film 33 which are exposed through the photo mask 34 to the ultraviolet rays are eliminated. Then, the glass substrate 30 is post-baked. It is to be noted that a negative photo resistant film and a negative photo mask are usable instead of the positive ones.

Figure 3E:
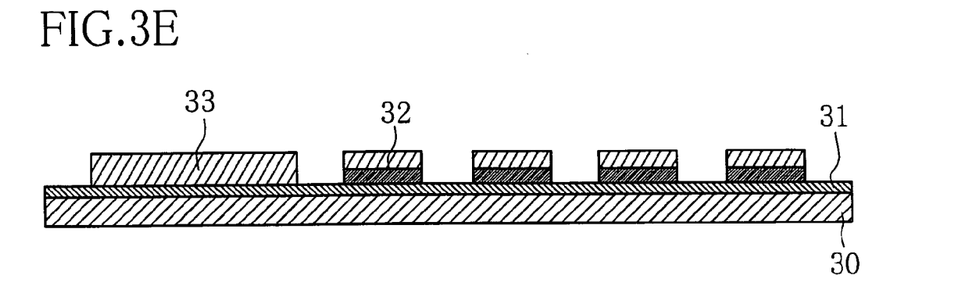
FIG. 3E illustrates a process of etching the gold film.
Figure 3F:
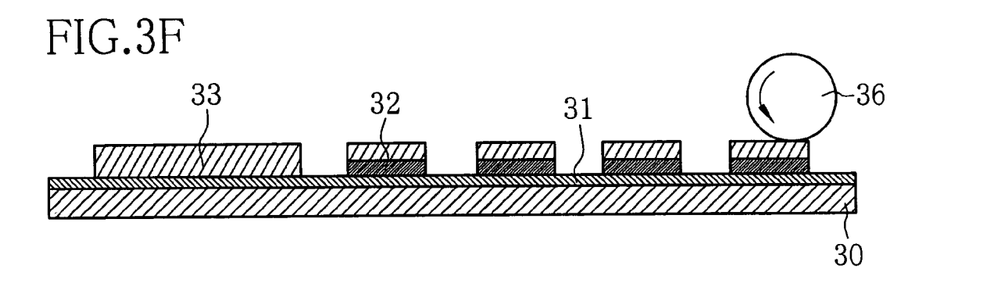
FIG. 3F illustrates a process of eliminating residue of the gold film.

Next, as shown in FIG. 3E, the post-baked glass substrate 30 is immersed in an etching solution for the gold, to etch the gold film 32, which comes to the surface. Thereafter, as shown in FIG. 3F, residues of the gold film 32, as being put on the surface, are eliminated by use of a roller 36.

Figure 3G:
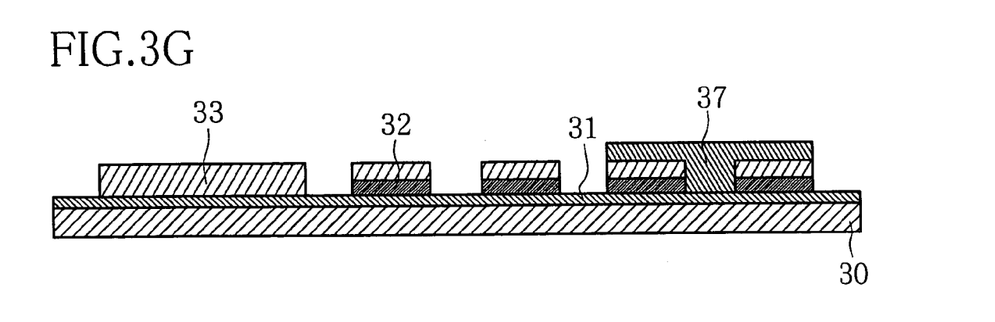
FIG. 3G illustrates a process of forming a resistant film, FIG. 3H a process of etching the ITO film.
Figure 3H:
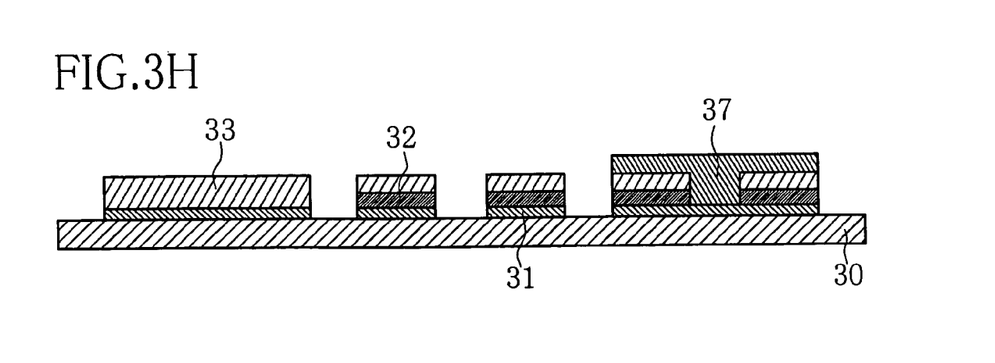

After eliminating the residues, a resistant film 37 is screen-printed only on a portion where the blocking mask 12 is to be formed, as shown in FIG. 3G. Then, the glass substrate 30 is immersed in an etching solution for ITO, to eliminate exposed portions of the ITO film 31 by etching, as shown in FIG. 3H.

Figure 3I:
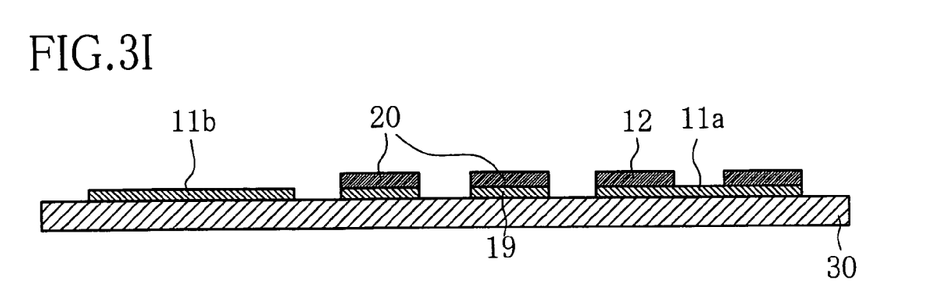
FIG. 3I illustrates a process of removing the photo resistant film and the resistant film and polishing.

Then, as shown in FIG. 3I, the photo resistant film 33 and the resistant film 37 are removed, and the surface of the glass substrate 30 is polished. In this way, the common electrode 11a, the blocking mask 12, the individual electrode 11b, the electrode pattern 19 and the gold film 20 are formed on the single glass substrate 30.

Figure 3J:
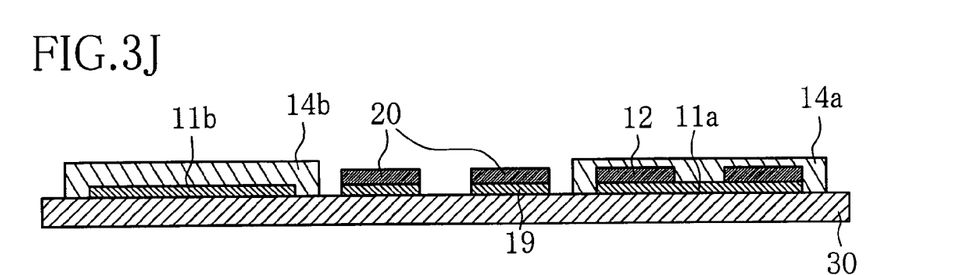
FIG. 3J illustrates a process of forming first and second isolation films.
Figure 3K:
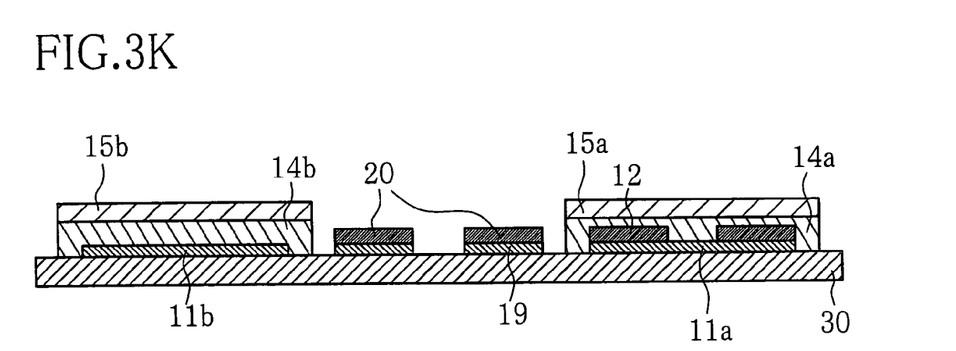
FIG. 3K illustrates a process of forming first and second orientation films.
Figure 3L:
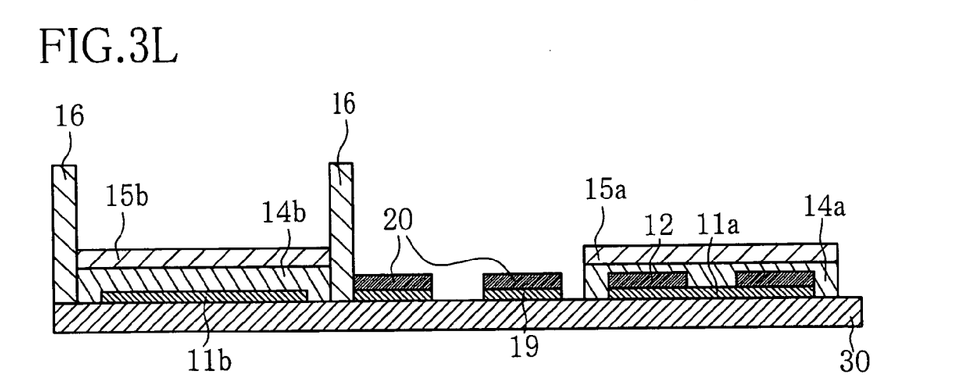
FIG. 3L illustrates a process of forming a sealing material.

Next, as shown in FIG. 3J, the first isolating film 14a is formed on the common electrode 11a and the blocking mask 12, and the second isolating film 14b is formed on the individual electrode 11b, respectively by screen-printing and baking. The, as shown in FIG. 3K, the first and second orientation films 15a and 15b are formed on the first and second isolating films 14a and 14b by screen-printing and baking, and the surfaces of the orientation films 15a and 15b are rubbed with a rubbing cloth. Thereafter, as shown in FIG. 3L, the sealing material 16 is formed by screen-printing on the glass substrate 30, on the side where the individual electrode 11b is formed.

Figure 3M:
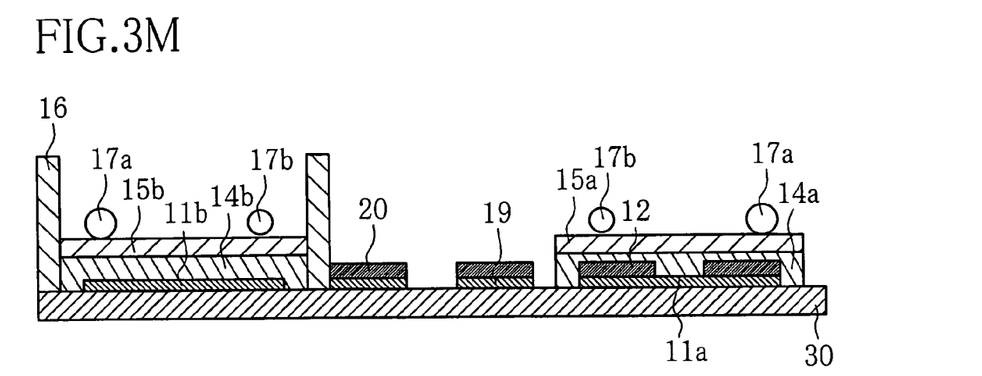
FIG. 3M illustrates a process of dispersing first and second spacers on the first and second orientation films.
Figure 3N:
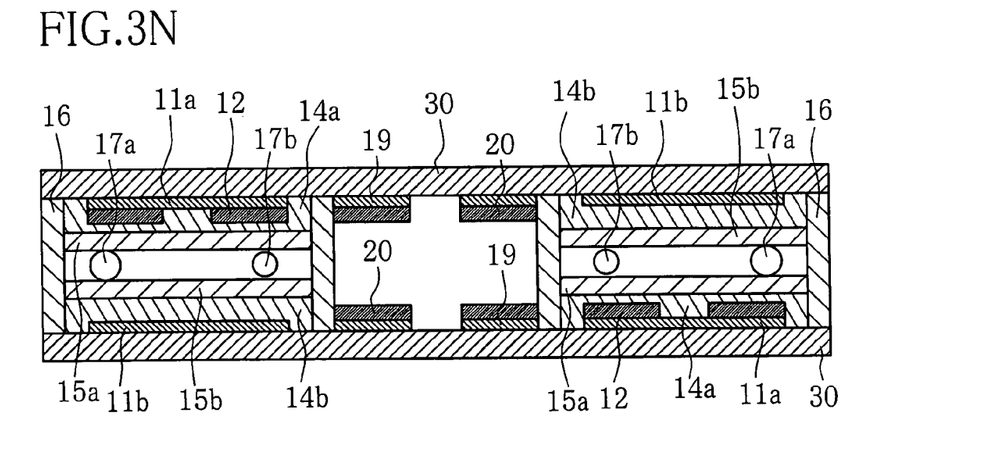
FIG. 3N illustrates a process of bonding the glass substrates together.

Then, as show in FIG. 3M, the first and second kinds of spacers 17a and 17b, whose diameters R and r satisfy the above-mentioned condition (1), are dispersed on both of the first and second orientation films 15a and 15b. First the second kind spacers 17b having a smaller diameter are dispersed at the dispersal density d, and then the first kind spacers 17a are dispersed at the dispersal density D, wherein the dispersal densities D and r satisfy the above-mentioned condition (2).

Figure 3O:
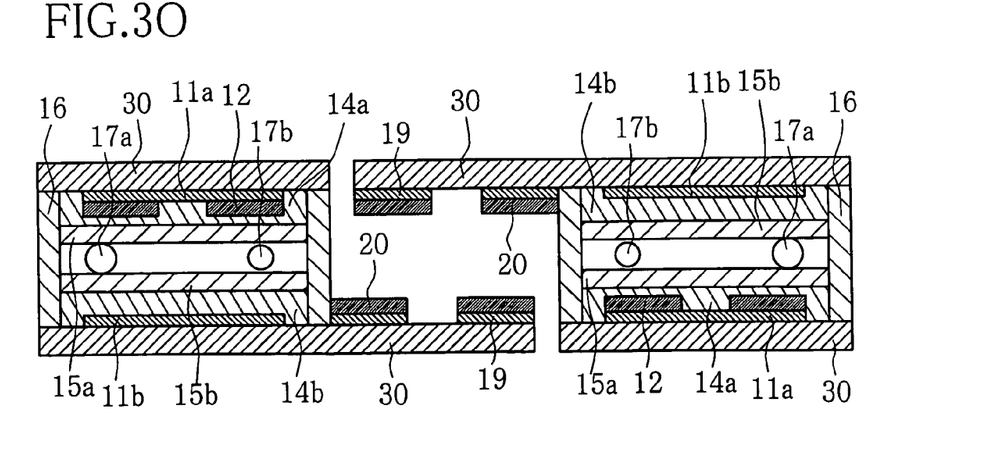
FIG. 3O illustrates a process of scribing and cutting the glass substrates.

Next, two of the glass substrates 30 as obtained through the above-described processes shown in FIGS. 3A to 3M, are mated together through the sealing material 16 such that the common electrode 11a of one glass substrate 30 is exactly opposed to the individual electrode 11b of the other glass substrate 30. Thereafter, as shown in FIG. 3O, scribe lines are drawn on predetermined positions of the two glass substrates 30, and the mated glass substrates 30 are slit along the scribe lines into two strips.

Figure 3P:
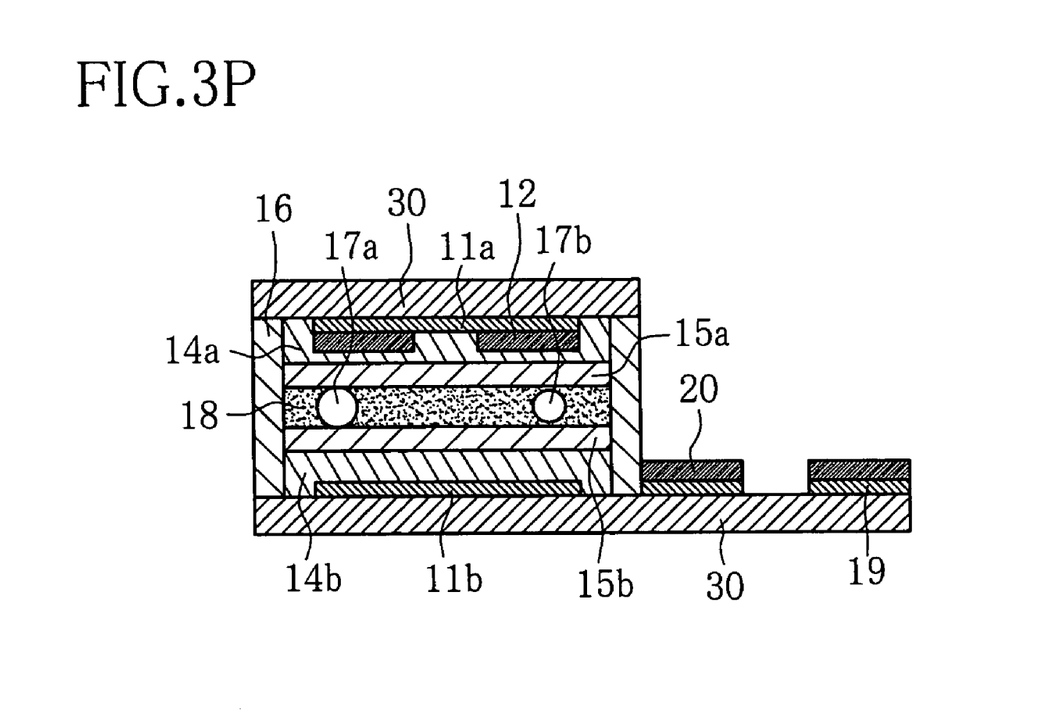
FIG. 3P illustrates a process of forming a liquid crystal layer.

Then, as shown in FIG. 3P, the liquid crystal is filled in the cell through a not-shown injection opening, to form the liquid crystal layer 18. After the liquid crystal layer 18 is formed, the injection opening is closed by an ultraviolet curable resin, and the ultraviolet rays are projected onto the resin to cure it. Thereafter, edges of the glass substrates 30 are chamfered. Then the liquid crystal layer 18 is subjected to an orientation test. If the result of the test is good, scribe lines are drawn on predetermined positions of the slit glass substrate 30, to cut it transversely into individual pieces whose size is determined according to the article.

Figure 3Q:
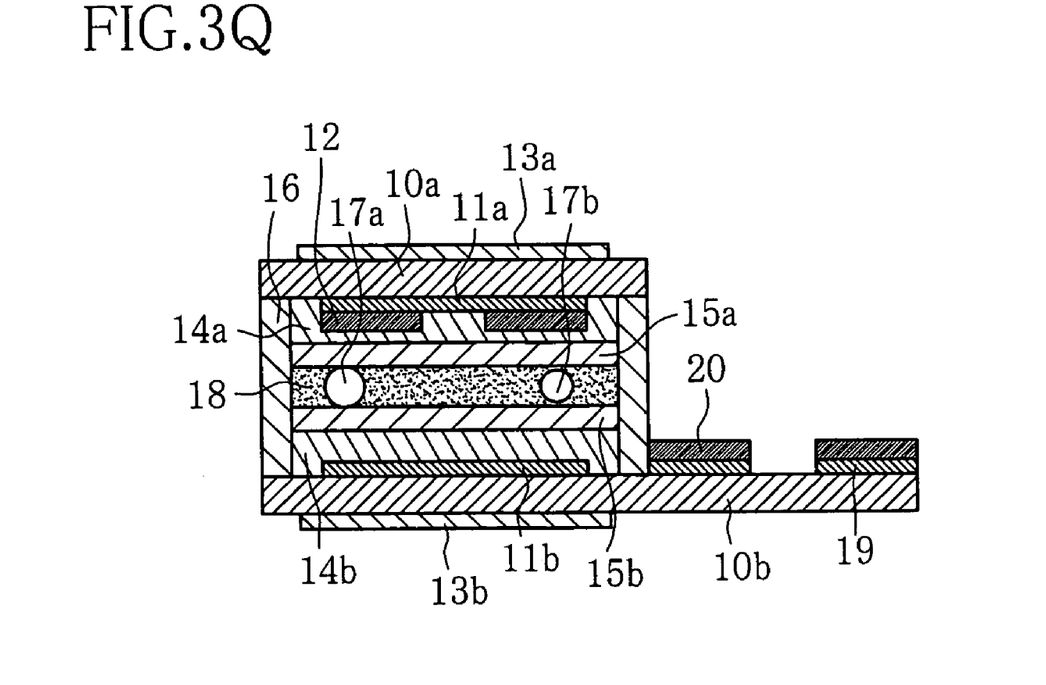
FIG. 3Q illustrates a process of bonding first and second polarizing plates to the glass substrates.

After cleaning glass swarf and glass powders from the surfaces of the first and second glass substrates 10a and 10b of the cut piece, the first and second polarizing plates 13a and 13b are bonded to the first and second glass substrates 10a and 10b respectively, as shown in FIG. 3Q. Thereafter, the signal cable 21 is connected to the gold film 20, and the liquid crystal driver IC 22 is mounted in the way as shown in FIG. 1. The products are subjected to an appearance inspection and a performance inspection, thereby completing the manufacture of the liquid crystal shutter 2.

As described so far, the liquid crystal shutter 2 of the present invention is manufactured using two kinds of spacers 17a and 17b having different spherical diameters. Therefore, the liquid crystal layer 18 is always put under an internal stress without the need for increasing the density of the first kind spacers 17a having the large diameter as used ordinarily. In addition, the second kind spacers 17b having the small diameter limits the distortion of the liquid crystal layer, especially at low temperatures. Accordingly, heat expansion or shrinkage is suppressed, so the generation of air bubbles in the liquid crystal layer is prevented. Thus, the present invention contributes to raising the reliability of the article using the liquid crystal shutter.

Although the above described embodiment uses two kinds of spacers 17a and 17b, it is possible to use more than two kinds of spacers depending upon the design of the liquid crystal shutter.

It is also possible to use a single kind of spacers, insofar as the sealing material of the liquid crystal shutter satisfies the following condition:

$$R < H - \sigma R - \sigma H - Q$$

wherein "R" represents a spherical diameter of the spacer, "H" represents a height of the sealing material, "σR" represent a standard deviation of the spherical diameter R, "σH" represents a standard deviation of the height H, and "Q" represents a permissible amount of dent of the sealing material. This embodiment provides the same effect as the above embodiment.

Although the liquid crystal shutter 2 of the above embodiment is so-called COG (Chip On Glass) type, where the liquid crystal driver IC 22 is mounted on the extended portion of the second glass substrate 10b, the present invention is not to be limited to this type. For example, the present invention is applicable to a liquid crystal shutter of COF (Chip On Film) type, where a liquid crystal driver IC is mounted on a flexible cable, or to a TAB (Tape Automated Bonding) type.

Note that the above-mentioned concrete examples of numerical values and materials are just exemplars, and not limitative of the present invention.

Thus, the present invention is not to be limited by the above described embodiments, but various modifications will be possible without departing from the scope of claims appended hereto.

What is claimed is:

1. A liquid crystal shutter comprising:
   a pair of substrates located in opposition to each other;
   a liquid crystal layer formed by enclosing a liquid crystal in a spacing between said substrates; and spherical spacers dispersed between said substrates to form said spacing, wherein said spacers include at least two kinds which are different in size, wherein the largest spherical diameter and a smaller spherical diameter of said at least two kinds of spacers satisfy the following condition:

$r < R - \sigma R - \sigma r - P$ wherein "R" represents the largest spherical diameter, "r" represents the smaller spherical diameter, "σR" and "σr" represent standard deviations of these spherical diameters, and "P" represents a permissible amount of dent of said liquid crystal layer.

2. A liquid crystal shutter comprising:

a pair of substrates located in opposition to each other;

a liquid crystal layer formed by enclosing a liquid crystal in a spacing between said substrates; and spherical spacers dispersed between said substrates to form said spacing, wherein said spacers include at least two kinds which are different in size, wherein said spacers are dispersed so as to satisfy the following condition:

$[\{\pi \cdot D \cdot (R^2/2) + \pi \cdot d \cdot (r^2/2)\}/x \cdot y] < 1/10^c$ wherein "D" represents a dispersal density of the largest spacers among said at least two kinds, "d" represents a dispersal density of the smaller spacers, "x·y" represents a cavity size of a cell, in which the liquid crystal layer is enclosed, and "C" represents a contrast of the liquid crystal shutter required at the opening and closing thereof.

3. A liquid crystal shutter as claimed in claim 2, wherein $D+d=100/mm^2$ to $300/mm^2$.

* * * * *